Feb. 13, 1934.  R. G. GEBHART  1,946,846
TRACTION SHOE
Filed Oct. 26, 1933  2 Sheets-Sheet 1
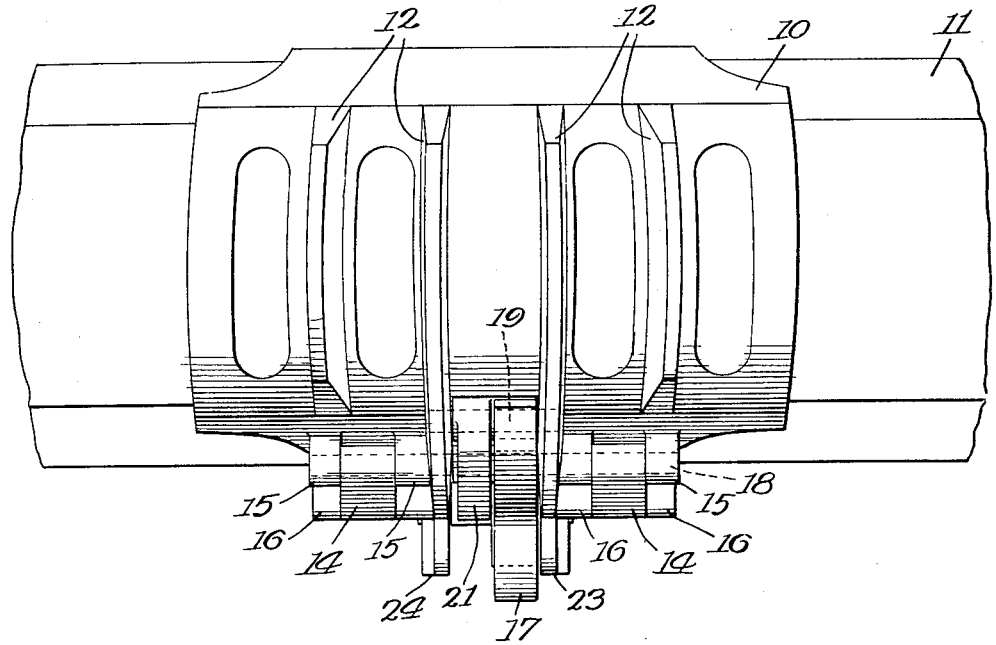
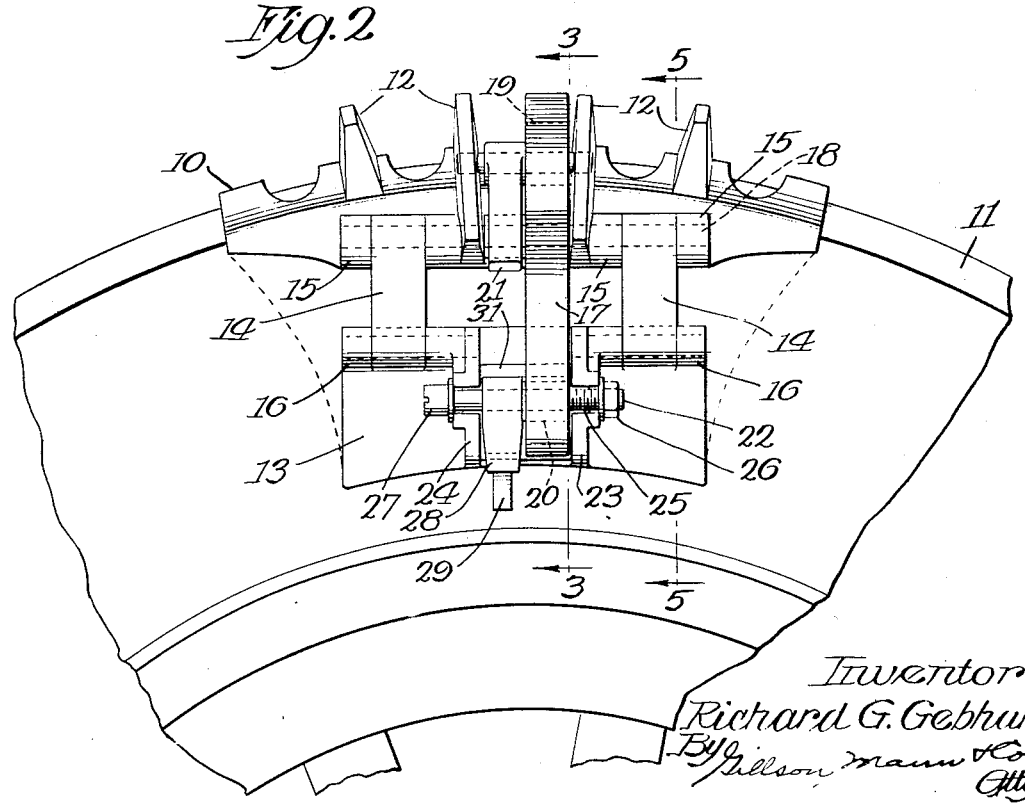
Inventor:
Richard G. Gebhart Feb. 13, 1934.  R. G. GEBHART  1,946,846
TRACTION SHOE
Filed Oct. 26, 1933  2 Sheets-Sheet 2
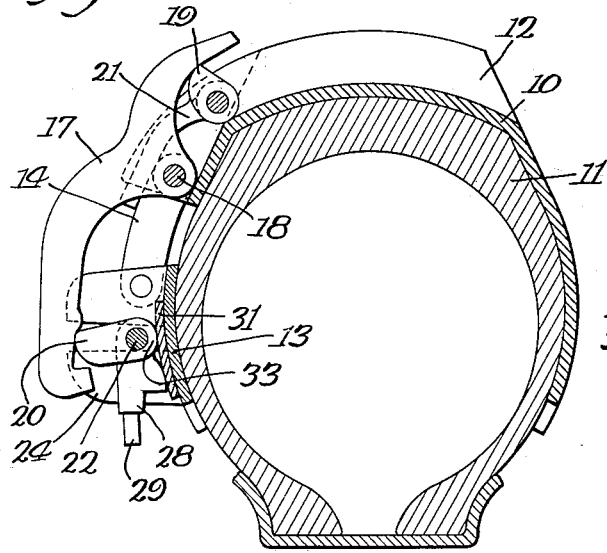
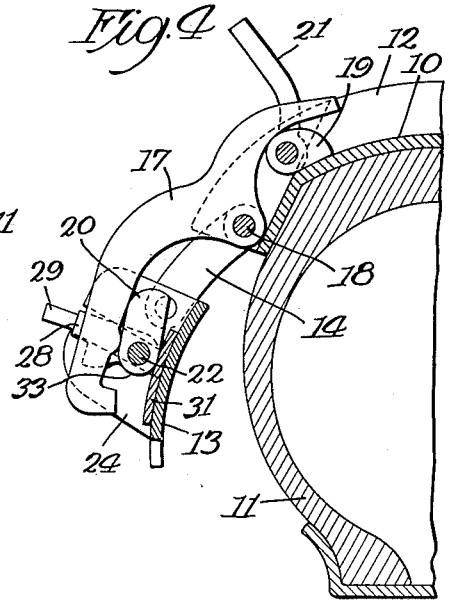
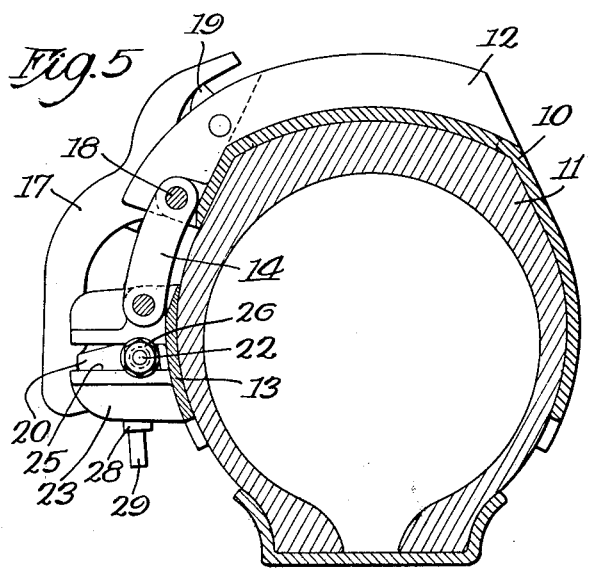
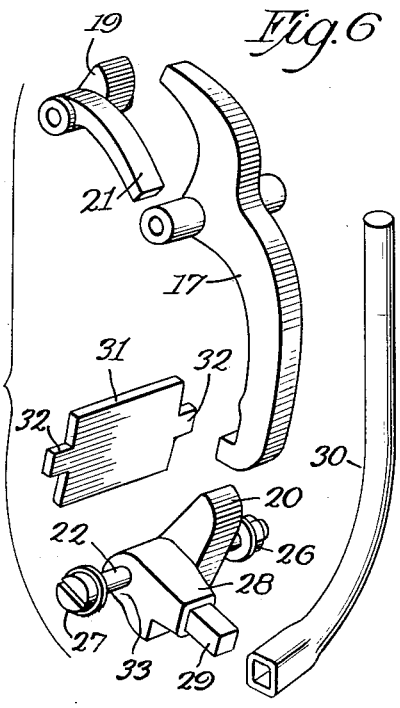
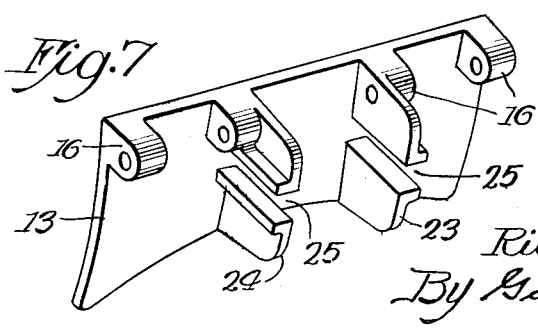
Inventor
Richard G. Gebhart
By Gillson, Mann & Co.
Attys.

Patented Feb. 13, 1934

1,946,846

UNITED STATES PATENT OFFICE 1,946,846

TRACTION SHOE

Richard G. Gebhart, Chicago, Ill.

Application October 26, 1933. Serial No. 695,230

4 Claims. (Cl. 152—14)

The invention relates to traction shoes for emergency use on automobile wheels; its object being to provide a device which may be readily attached to the tire, in the event of the vehicle being stalled by a slipper road, and is readily removed when the vehicle has been driven out of trouble.

These objects are attained by the device hereinafter described, and illustrated in the accompanying drawings, which is a practical embodiment of the invention. In the drawings:

Fig. 1 is a face view in detail of an automobile tire with the traction device applied thereto;

Fig. 2 is a detail side view of the tire with the device attached;

Fig. 3 is a sectional view on the line 3—3 of Fig. 2;

Fig. 4 is a detail of the tire on the same plane, the traction device being loosely applied thereto;

Fig. 5 is a sectional view on the line 5—5 of Fig. 2;

Fig. 6 is a view in perspective of the several elements of the locking mechanism of the device; and Fig. 7 is a view in perspective of the clamping plate of the device.

In the use of automobiles difficulty is frequently encountered by the occurrence, in a roadway, of slippery places, due to mud or snow or ice, which may cause the stalling of the vehicle, if obliged to pass over them at slow speed. It has been common practice to attempt to overcome this difficulty by permanently applying to the tires chains or other gripping devices, but this expedient very frequently proves to be ineffective because the means applied to the tread of the tire for increasing its traction must necessarily be of such nature as not to interfere objectionably with the operation of the vehicle on portions of the road which are in fair condition, and is, therefore, ineffective to meet the emergency. Furthermore, such permanently attached traction devices are rapidly worn out on hard pavements.

Great difficulty has been encountered in providing traction increasing devices which may be easily, quickly and securely attached to a wheel when the vehicle has become stalled, and no such device has heretofore proved successful.

In the illustrated embodiment of the invention the traction element takes the form of a shoe 10, which is approximately semi-circular in cross-section and is adapted to hook over the tire 11 and extend beyond its transverse median line. Formed integrally upon the outer face of this shoe, and in position to extend across the tread face of the tire, are a number of ribs 12, the edges of which are sufficiently sharp to insure a secure grip upon an ice-coated surface and the radial width of which is sufficient to insure a firm grip upon a soft surface. In practice it has been found that ribs having a radial width of approximately three-fourths of an inch have been found to be entirely satisfactory. These ribs may be of any desired number, four being shown.

The securing mechanism for the shoe comprises a segmental plate 13, having a curvature corresponding approximately with that of the side face of the tire to which the device is applicable, and of sufficient length to insure stability of attachment. This plate is attached to the shoe 10 adjacent its outer margin by means of a pair of links 14, the ends of which are pivotally secured to lugs, as 15, which are formed on the shoe 10, and 16 formed on the plate.

The locking means for securely attaching the device to a tire comprises a lever arm 17, pivotally attached to the shoe 10 preferably, as shown, by means of the pivot pin 18, which carries the links 14, and a pair of cams 19, 20, cooperating with both ends of the lever arm. The cam 19 is pivotally attached to the inner pair of the ribs 12, and is provided with a handle bar 21, by means of which it may be turned to form a bearing for the inner end of the lever 17. The cam 20 is pivoted upon a pin 22, carried by a pair of outstanding jaws 23, 24, formed integrally with the plate 13, and slotted, as shown at 25, to receive the pivot pin and permit its adjustment relatively to the face of the plate. The pin 22 is secured in its adjusted position by means of a nut, as 26, applied to its end; the pin, as shown, being provided with an integral slotted head 27.

The cam 20 is controlled by means of an integral arm 28, to the squared end 29 of which may be applied a socketed handle bar 30. This cam is adjustably attached to the plate 13, as shown, in order that the device may be tightly fitted upon tires which may slightly vary in size. Should it be found that when the reaction of the cam is directly upon the face of the plate the device is not securely clamped to the tire, one or more shims, such as 31, may be inserted between the jaws 23, 24, their end lugs 32 fitting within the slots 25, the shims serving as a bearing for the heel 33 of the cam 20.

In applying the device, the parts of the securing means are moved to the position shown in Fig. 4, and the body of the shoe is hooked over the tire. The cam 19 is now turned to the position of Fig. 3, and the handle bar 30 is applied to the shank 29 of the cam 20 and sufficient downward pressure on this bar is applied to turn the cam 20 to the possible limit of its movement, forcing the outer arm of the lever 17 outwardly and binding the plate 13 securely against the outer face of the tire and the inner portion of the shoe 10 against the inner face of the tire. The parts being suitably adjusted, as by means of the shims 31, the device is secured to the tire against all possible danger of slippage.

While the cam 19 is not essential to the securing of the device to the tire, it contributes to its easy application by permitting a wider spread of the parts 10 and 13.

The device may be applied to a tire in a very few seconds and as quickly removed; and it is reliable in its action.

What I claim is:

1. In a device of the kind described, a segmental shoe shaped to conform to a tire and to overlap the tread face and one side face thereof, a segmental plate for engaging a side face of a tire and connected to the shoe by a link pivoted to each of the named parts, a lever pivoted to one of the named parts and a cam reacting between one of the parts and the lever for urging the lever against the other part.

2. In a device of the kind described, a segmental shoe shaped to conform to a tire and to overlap the tread face and one side face thereof, a segmental plate for engaging a side face of a tire and connected to the shoe by a link pivoted to each of the named parts and a lever pivoted to the shoe intermediate of its ends, and a cam located between the shoe and the end of the lever projecting thereover for positioning the opposite end of the lever relative to the plate.

3. In a device of the kind described, a segmental shoe shaped to conform to a tire and to overlap the tread face and one side face thereof, a segmental plate for engaging a side face of a tire and connected to the shoe by a link pivoted to each of the named parts, a lever pivoted to the shoe and projecting over the shoe beyond such pivot and over the plate, and cams carried by the shoe and plate for urging the ends of the lever outwardly.

4. In a device of the kind described, a segmental shoe shaped to conform to a tire and to overlap the tread face and one side face thereof, a segmental plate for engaging a side face of a tire pivotally connected to the shoe, a lever pivoted to the shoe and projecting over the shoe beyond such pivot and over the plate, and cams carried by the shoe and plate for urging the ends of the lever outwardly.

RICHARD G. GEBHART.